United States Patent Office 3,277,223
Patented Oct. 4, 1966

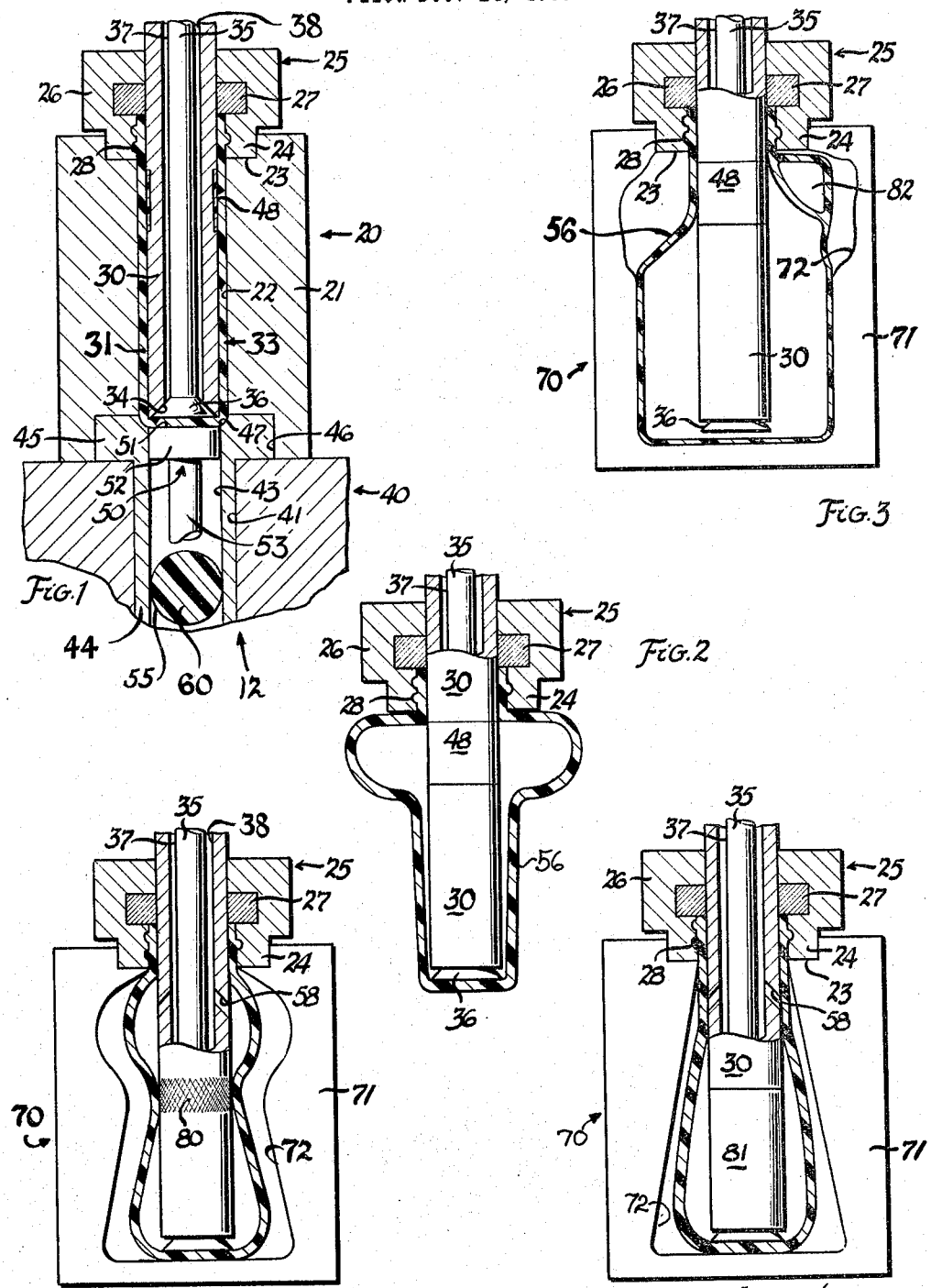

3,277,223
METHOD AND APPARATUS FOR FORMING A HOLLOW PLASTIC ARTICLE
Nicholas J. Curto, Toledo, Ohio, assignor to Owens-Illinois, Inc., a corporation of Ohio
Filed Dec. 14, 1965, Ser. No. 513,783
5 Claims. (Cl. 264—97)

The present invention relates to a method and apparatus for making a plastic article, and, more particularly, this invention proposes a method and apparatus wherein an initially injection molded blank or preform is subsequently enclosed by and blown in a partible blow mold.

In the blow molding of plastic articles, such as containers or the like, the present commercial practice basically involves the extrusion of a tubular blank of heat-softened plastic material, closing a sectional blow mold on the tube to pinch the tube shut at one end and finally injecting air under pressure through the other still-open end of the tube to inflate the pinched tube to the configuration of the blow mold.

Several variants of this process are utilized which are well known to those skilled in the art. In each case, closure of the tube by the blow mold necessarily produces a waste or "tail end" portion which must be removed subsequently from the blown article; and where the neck or "finish" of a container is blown, neck flash or neck joined waste portions are also produced for necessary later removal.

To eliminate such waste portions, processes utilizing injection molded parisons or blanks has been proposed, as in United States Letters Patent No. 3,172,929, to Thomas R. Santelli, for a "Method of Forming a Hollow Plastic Article" and assigned to the assignee of the present application.

In such a process, the formation of a waste-free, injection molded and subsequently blown blank is obtained by injection molding wherein the material to be injection molded is introduced into the mold cavity through an opening of appreciable size and subsequently corresponding to one dimension, usually the opposed bottom dimension, of the injection molded blank.

It is also possible to injection mold the blank or parison through a gate of very narrow cross sectional dimension into an injection mold cavity of substantially larger cross sectional dimensions. In such processes, it is impractical, and sometimes impossible, to produce containers of substantially varying cross sectional dimensions. It has also been impossible (from a practical standpoint) to produce by injection molded parison techniques a container having a hollow handle.

It is, therefore, an important object of the present invention to provide a novel method and apparatus for making a blown plastic article having substantially varying cross sectional dimensions.

It is a further object of this invention to provide an improved method and apparatus for the manufacture of a plastic article by injection molding a blank or preform in an injection mold cavity followed by blow molding the container in a mold having substantially varying cross sectional dimensions.

Yet another important object of this invention is the provision of a method and apparatus for injection molding a parison and subsequently blow molding a container having a hollow handle at its periphery.

A further object of the present invention is to provide an injection blow molding process and apparatus wherein the injection mold core pin is treated to facilitate or retard movement of the plastic material therefrom during a pre-blow cycle.

These and other objects of this invention will become apparent from the reading of the following detailed description taken in conjunction with the drawings.

On the drawings:
FIGURE 1 is a vertical sectional view of an injection molding apparatus illustrated during performance of the initial injection molding step of this invention;
FIGURE 2 is a view similar to FIGURE 1, illustrating the apparatus during the pre-blowing of the parison;
FIGURE 3 is a vertical sectional view, illustrating the apparatus positioned to carry out the blowing of the parison to the configuration of the final article;
FIGURE 4 is a view similar to FIGURE 3, but with a modified form of core pin positioned within a different blow mold and the plastic material blown to its final configuration; and
FIGURE 5 is a view similar to FIGURE 3, illustrating a further modification of the invention of this application.

Referring now to the drawings, reference numeral 20 denotes an injection molding apparatus capable of carrying out the method of the present invention. The apparatus is shown as particularly adapted to the manufacture of bottles or containers having necks or "finish" portions which are exteriorly peripherally threaded. It will be appreciated that the apparatus and method herein disclosed are well adapted to the manufacture of other articles and that the specific showing of containers is merely exemplary.

More specifically, the injection molding apparatus 20 includes a centrally located blank mold 21 having a central cylindrical mold cavity 22. The mold 21 preferably is oriented so that the axis of the cylindrical cavity 22 extends vertically although, if desired, the axis of the cavity may be oriented horizontally. The central blank mold 21 is provided with an upper recess 23 concentric with the axial cavity 22 and snugly receiving therein a lower embossed portion 24 of an upper neck or finish mold 25, comprising transversely separable mold segments 26. The utilization of such mold segments and various actuating means for separating the same transversely are well known in the art and need not be described in detail herein.

Each of the mold segments 26 carries internal blocks 27 upon which the segments are movable transversely, and such blocks 27 define at their lower ends the upper extremities of a generally cylindrical neck mold cavity 28 cooperably defined by semicylindrical, partially threaded recesses in the abutting faces of the mold segments. When closed, the segments 26 are aligned with the body mold 21 so that the cavity 22 cooperates with the neck mold 28 to define the complete exterior periphery of the desired preform.

The interior periphery of the mold cavity is defined by a tubular sleeve 30 projecting axially into the neck mold cavity 28 and the cavity 22 with the cylindrical periphery 31 thereof being spaced peripherally from the cavity 28 and the cavity 22 to define a complete mold cavity, as indicated generally by reference numeral 33. The lower axial extremity of the sleeve 30 is internally chamfered, as at 34, to define a valve seat against which is seated a blow valve element, indicated generally at 35, and having a lower enlarged head 36. The frusto-conical exterior periphery of the head 36 cooperates with the chamfered valve seat 34 to control the flow of air through an annular flow path 37 defined between the valve element 35 and the inner periphery 38 of the sleeve 30.

Located in axial alignment with the mold cavity 33 and underlying the mold block 21 is a material supply block, indicated generally at 40 and having an axial passage 41 therein, axially aligned with the mold cavity 33. It should be understood that various material supply blocks may be used, and the one shown and described herein is merely for the purposes of illustration.

The supply block passage 41 carries a liner 42 which is annular in cross sectional configuration and which is provided with an internal bore 43 defined by a tubular body 44 and an upper radially enlarged head 45 covering the joint between the supply block 40 and the mold block 21. More particularly, the radially enlarged head 45 is snugly seated in a recess 46 in the lower portion of a mold block 21. In addition to bridging the gap between the mold block 21 and the supply block 40, the enlarged head 45 defines the extreme lower portion of the mold cavity 33 by the provision of curved inner corners 47, thereby preventing the necessity of milling or otherwise forming these smoothly contoured corners in a relatively inaccessible portion of the mold block 21.

Reciprocable within the supply block 40 is a vertically movable injection piston 50. The piston 50, of course, fits snugly within the liner bore 43 and has an upper, planar, circular face 51 formed at the end of a piston rod 52 joined to and movable with an actuating rod 53 movable by a suitable source of power, such as a fluid actuated cylinder (not shown).

Plastic material is supplied to the liner bore 43 through a transverse supply passage 55. Plastic material is supplied to the supply passage 55 from a suitable source such as a screw-type plasticizer, which devices are conventional and well known to those skilled in the art and need not be described in detail herein. Plastic material in the passage 55 is, when desired, displaced transversely into the bore 43 to be displaced therefrom into the mold cavity 33 upon upward movement of the injection piston 50.

After the plasticized material 60 has been supplied to the bore 43, the injection piston 50 is advanced through the bore 43, picking up the plastic material and displacing the material upwardly into the injection mold cavity 33 to form the parison or preform 56. The lower end of the sleeve 30 thus forms a core pin about which the parison is injection molded.

In accordance with one embodiment of this invention, the upper portion of the core pin 30 immediately below the finish cavity 28 is provided with an external coating 48 of a release coating, such as polytetrafluoroethylene. The coating 48 may be applied by any known method to those skilled in the art, which method of coating metal surfaces is well known and need not be described in detail herein.

Following the formation of the preform as illustrated in FIGURE 2 of the drawings, the injection molded preform or parison is removed from the body mold 21, such removal being effected without the removal of the preform from the blow tube 30 or from the composite neckmold 25. Such removal of the injection molded preform may be accomplished by axially upwardly withdrawing the assembly of preform 56, neckmold 25 and blow tube 30; alternatively a segmented body mold 20 may be provided with the body mold segments then being laterally separable to more readily accommodate removal of the injection molded preform or parison.

Following removal of the preform 56, preferably vertically, from the body mold 21, low pressure air is introduced into the preform through passages 37 by downward movement of rod 35.

As can be seen from FIGURE 2, the introduction of low pressure air strips the parison or preform 56 from the blow tube 30. To so strip the parison, the air pressure must overcome the parison-to-tube surface adherence. Further, since only a limited volume of air is introduced into the parison, that portion of the parison which is first stripped will be inflated to a greater degree than that which is later stripped. Of course, this is a time-related function, but a momentarily nonuniform "puffed" parison will be obtained, as shown in FIGURE 2. Thus, since the plastic material tends to adhere more closely to the non-coated portions of the blow tube 30 than to the polytetrafluoroethylene coated portions thereof, the inverted pear-shape preform of FIGURE 2 is obtained.

The preform is now enclosed in a pair of separable blow mold segments 70 which blow mold segments have abutting vertical faces 71 and interior cavity defining surfaces 72 which cooperatively define the final configuration of the blown portion of the article. The blow mold segments 70 have handle-opening-defining inserts 82 positioned to contact the inflated upper parison portions. The valve rod 35 is actuated vertically downward to further open the valve port defined by the chamfered surfaces 34 and to accommodate the continued passage of blow air through the annular space 37 defined between the blow tube 30 and the valve rod 35, and hence between the rod head 36 and the chamfered valve seat surfaces 34. Air so introduced into the interior of the preform readily inflates the already puffed preform against the blow mold cavity surface 72, so that the final blown portions of the article are formed. Of course, the greater inflation of the readily puffed upper portion of the parison provides sufficient size of the parison for engagement by the handle-defining inserts 82.

Following the blowing of the final article, the separable blow molds are opened. The separable blow mold segments 70 are laterally separated, and the segments 26 of the neckmold 25 are also laterally separated, so as to accommodate removal of the final blown article from the composite mold. Following such removal, the neckmold 25 is moved downwardly into engagement with the body mold 21 for the next injection molding step. The hereinbefore described cycle is then repeated.

If the final container configuration is of the hour-glass shape, as shown in FIGURE 4, the center surface of the core pin 30 will be roughened, as at 80, by sand blasting or other conventional methods to increase pin-parison adherence. The plastic material, during the low pressure air introduction tends to stick to that portion 80 of the core pin exterior surface. If a flask-type container is desired, the lower portion of the core pin 30 may be coated with polytetrafluoroethylene, as at 81 in FIGURE 5.

As can be seen from the foregoing description, this invention permits the injection molding of a preform and subsequent blow molding of a container of substantially uniform wall thickness but of substantially varying horizontal cross sectional configuration. It also permits the blow molding of a hollow handled container, as shown in FIGURE 3. These results are obtained by differentially pre-puffing a parison by merely varying the adherence of the parison to the core pin.

It should be understood that various modifications may be resorted to within the spirit and scope of this invention, without departing from the following claims.

I claim:

1. A method of blow molding a plastic article by the steps of injection molding a parison about a core pin of varying surface characteristics affecting parison-pin adherence, introducing a limited volume of a gaseous medium at relatively low pressure into the parison to partially and differentially expand the parison from the surface of the core pin, enclosing the differentially expanded parison in a blow mold and completely expanding the same interiorly of the blow mold.

2. A method as defined in claim 1, wherein the core pin surface is of varying degrees of smoothness, the smoother the surface the more easily the parison is released and expanded therefrom.

3. A method as defined in claim 2, wherein said parison core pin is coated with polytetrafluoroethylene in selected localized areas to increase the smoothness of said coated areas.

4. A method as defined in claim 2 wherein portions of the parison core pin surface is roughened in selected localized areas to increase pin-parison adherence and to decrease expansion of the parison in said localized areas.

5. In an apparatus for blow molding plastic articles and including a parison mold having a cavity of the external configuration of the parison, a core pin adapted to be positioned within said parison mold to form an injection mold cavity, means for introducing plasticized material into said injection mold cavity to form a parison, means for removing said parison core pin with said parison positioned thereon from said parison mold, means for introducing a low pressure gaseous medium into said parison, and blow mold means adapted to surround said parison and having a cavity of the ultimately desired article configuration, the improvement of said core pin having an exterior surface of varying degrees of roughness, the roughest portions of said pin coinciding with the least inflated portions of said final article.

References Cited by the Examiner

UNITED STATES PATENTS

| | | | |
|---|---|---|---|
| 2,953,817 | 9/1960 | Miller. | |
| 3,012,286 | 12/1961 | Gasmire | 264—97 |
| 3,170,970 | 2/1965 | Adams | 264—97 |
| 3,191,225 | 6/1965 | Polka | 18—5 |

ROBERT F. WHITE, *Primary Examiner.*

R. B. MOFFITT, *Assistant Examiner.*